US009631577B2

(12) United States Patent
Lelong

(10) Patent No.: US 9,631,577 B2
(45) Date of Patent: Apr. 25, 2017

(54) THREADED ROD FOR SYSTEM FOR DEPLOYING A DEPLOYABLE DIVERGENT SEGMENT OF A THRUSTER

(71) Applicant: SNECMA, Paris (FR)

(72) Inventor: Jacques Lelong, Puiseux en Bray (FR)

(73) Assignee: SNECMA, Paris (FR)

( * ) Notice: Subject to any disclaimer, the term of this patent is extended or adjusted under 35 U.S.C. 154(b) by 569 days.

(21) Appl. No.: 14/080,009

(22) Filed: Nov. 14, 2013

(65) Prior Publication Data

US 2014/0131481 A1 May 15, 2014

(30) Foreign Application Priority Data

Nov. 15, 2012 (FR) ...................................... 12 60864

(51) Int. Cl.
*F02K 9/97* (2006.01)
*F02K 1/08* (2006.01)
(Continued)

(52) U.S. Cl.
CPC .................. *F02K 1/08* (2013.01); *F02K 1/00* (2013.01); *F02K 1/008* (2013.01); *F02K 1/06* (2013.01);
(Continued)

(58) Field of Classification Search
CPC ... F02K 1/00; F02K 1/008; F02K 1/06; F02K 1/08; F02K 1/09; F02K 1/10; F02K 1/52; F02K 9/00; F02K 9/84; F02K 9/97; F02K 9/976; F16H 25/2418; F16H 25/2204; F16H 2025/2037; F16H 2025/204; F16H 2025/209; B23Q 5/40; B23Q 11/0875
See application file for complete search history.

(56) References Cited

U.S. PATENT DOCUMENTS 2,464,873 A * 3/1949 Lear ........................ B64C 13/30
74/606 R
4,313,567 A 2/1982 Feight
(Continued)

FOREIGN PATENT DOCUMENTS

EP 0 661 436 A1 7/1995
FR 2 949 821 A1 3/2011

OTHER PUBLICATIONS

French Preliminary Search report issued Aug. 22, 2013 in French Application 1260864, filed on Nov. 15, 2012 ( with English Translation of Categories of Cited Documents).

*Primary Examiner* — Gerald L Sung
*Assistant Examiner* — Scott Walthour
(74) *Attorney, Agent, or Firm* — Oblon, McClelland, Maier & Neustadt, L.L.P.

(57) ABSTRACT

A divergent segment includes a stationary divergent portion and a movable divergent portion suitable for occupying a retracted position and a deployed position. The threaded rod has a head supported by a support secured to the stationary divergent portion in cooperation with a rotary drive for driving the threaded rod in rotation, and a tip suitable for being inserted in a holder sleeve secured to the stationary divergent portion. The threaded rod cooperates with a nut secured to the movable divergent portion so that rotation of the rod causes the movable divergent portion to move. The tip presents an enlargement having at least one groove passing axially therethrough.

4 Claims, 3 Drawing Sheets

(51) Int. Cl.
  *F02K 1/52*  (2006.01)
  *F02K 1/00*  (2006.01)
  *F02K 1/06*  (2006.01)
  *F02K 1/09*  (2006.01)
  *F02K 1/10*  (2006.01)
  *F02K 9/00*  (2006.01)
  *F02K 9/84*  (2006.01)
  *F16H 25/20*  (2006.01)
  *B23Q 5/40*  (2006.01)
  *F16H 25/24*  (2006.01)
  *F16H 25/22*  (2006.01)
  *B23Q 11/08*  (2006.01)

(52) U.S. Cl.
  CPC ............... *F02K 1/09* (2013.01); *F02K 1/10* (2013.01); *F02K 1/52* (2013.01); *F02K 9/00* (2013.01); *F02K 9/84* (2013.01); *F02K 9/97* (2013.01); *F02K 9/976* (2013.01); *B23Q 5/40* (2013.01); *B23Q 11/0875* (2013.01); *F05D 2250/42* (2013.01); *F16H 25/2204* (2013.01); *F16H 25/2418* (2013.01); *F16H 2025/204* (2013.01); *F16H 2025/209* (2013.01); *F16H 2025/2037* (2013.01)

(56) References Cited

U.S. PATENT DOCUMENTS

| | | |
|---|---|---|
| 5,282,576 A | 2/1994 | Chatenet et al. |
| 5,641,123 A | 6/1997 | Kishimoto et al. |
| 6,786,267 B1 * | 9/2004 | Warren ............... B60C 25/13 157/1.2 |
| 2012/0167575 A1 | 7/2012 | Dobek et al. |

* cited by examiner

THREADED ROD FOR SYSTEM FOR DEPLOYING A DEPLOYABLE DIVERGENT SEGMENT OF A THRUSTER

BACKGROUND OF THE INVENTION

The present invention relates to a deployable divergent segment of a thruster comprising a stationary divergent portion and a movable divergent portion suitable for occupying a retracted position and a deployed position. More precisely, the invention relates to a system for deploying such a divergent segment and to a threaded rod forming part of such a system.

Such a threaded rod has a head suitable for being supported by a support secured to the stationary divergent portion and co-operating with rotary drive means for driving the threaded rod in rotation, and a tip suitable for being inserted in a holder sleeve secured to the stationary divergent portion, the threaded rod being suitable for co-operating with a nut secured to the movable divergent portion in such a manner that rotating said rod causes the movable divergent portion to move.

A control system of that type, and specifically having three threaded rods that are regularly spaced apart angularly, is disclosed in French patent application number 2944063. Overall, that system gives satisfaction, the threaded rods, also known as worm-screws, constitute both the elements that cause the movable divergent portion to move, and the means for guiding that movement. Nevertheless, the diverging segments of thrusters, and thus their deployment systems, are subjected to conditions that are extreme. In particular, in operation, ambient temperatures may be as high as 1600 K. As a result, the materials that can be selected for use are extremely restricted. In particular, the available materials are generally very sensitive to friction forces. When selecting a material, its ability to withstand very high temperatures needs to be given precedence over its tribological parameters.

Furthermore, as mentioned above, the threaded rod(s) of the system for deploying the divergent segment also contribute to guiding its movement. To do this, it is appropriate for the threaded rods to be held properly while they are rotating. Consequently, the clearance existing in the holder sleeve around the tip of the threaded rod is generally very small. This is also necessary for limiting vibration phenomena in operation. Nevertheless, because of the small size of this clearance, friction between the tip of the threaded rod and the inside surface of the sleeve in which it is inserted is large.

Furthermore, because of the environment of the divergent segment and because of the extreme conditions to which it is subjected in operation, the deployment system can become dirty, in particular in the region of the holder sleeve.

For all these reasons, there is a risk that the tip of the threaded rod might become jammed in the sleeve, during its rotation that is required for moving the movable divergent portion. Such jamming must be avoided in order to provide good operating conditions.

OBJECT AND SUMMARY OF THE INVENTION

An object of the invention is thus to provide a threaded rod for a system for deploying a divergent segment, and to propose a divergent segment deployment system in which the risks of the tip of the threaded rod jamming in the holder sleeve are minimized.

This object is achieved with a threaded rod of a system for deploying a deployable divergent segment of a thruster, the divergent segment comprising a stationary divergent portion and a movable divergent portion suitable for occupying a retracted position and a deployed position, the threaded rod having a head suitable for being supported by a support secured to the stationary divergent portion in cooperation with rotary drive means for driving the threaded rod in rotation, and a tip suitable for being inserted in a holder sleeve secured to the stationary divergent portion, the threaded rod being suitable for co-operating with a nut secured to the movable divergent portion so that rotation of said rod causes the movable divergent portion to move, wherein the tip presents an enlargement having at least one groove passing axially therethrough.

Thus, the holder sleeve continues to perform its role in full by co-operating with the enlargement of the tip of the threaded rod. In particular, it is always possible to ensure that the clearance between the outside surface of the enlargement and the inside surface of the sleeve is extremely small so as to ensure good rotary guidance for the threaded rod and so as to avoid vibration. Nevertheless, because of the presence of at least one groove passing axially therethrough, any risk of friction is minimized, since the surface areas involved are reduced compared with a situation in which there is no groove. Furthermore, because the groove passes axially through the enlargement, it enables any potential particles of dirt to be discharged, which particles might otherwise accumulate between the tip of the threaded rod and the inside wall of the sleeve, so as to give rise to friction that is excessive, or indeed so as to give rise to jamming.

In at least one embodiment, the enlargement has a plurality of radial branches that are separated by grooves passing axially through the enlargement.

The contact area between the enlargement and the inside wall of the sleeve corresponds merely to the areas of the ends of the radial branches, while the presence of a plurality of grooves that pass axially through the enlargement favors not only reducing contact area, but also removing dirt.

In at least one embodiment, said at least one groove passing axially through the enlargement presents an opening angle lying in the range 30° to 100°, and preferably in the range 60° to 90°.

Such an angular opening is found to give a good compromise between the need to limit clearance between the tip of the threaded rod and the inside wall of the sleeve, and the need to limit contact areas and to favor the removal of dirt.

BRIEF DESCRIPTION OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 1:
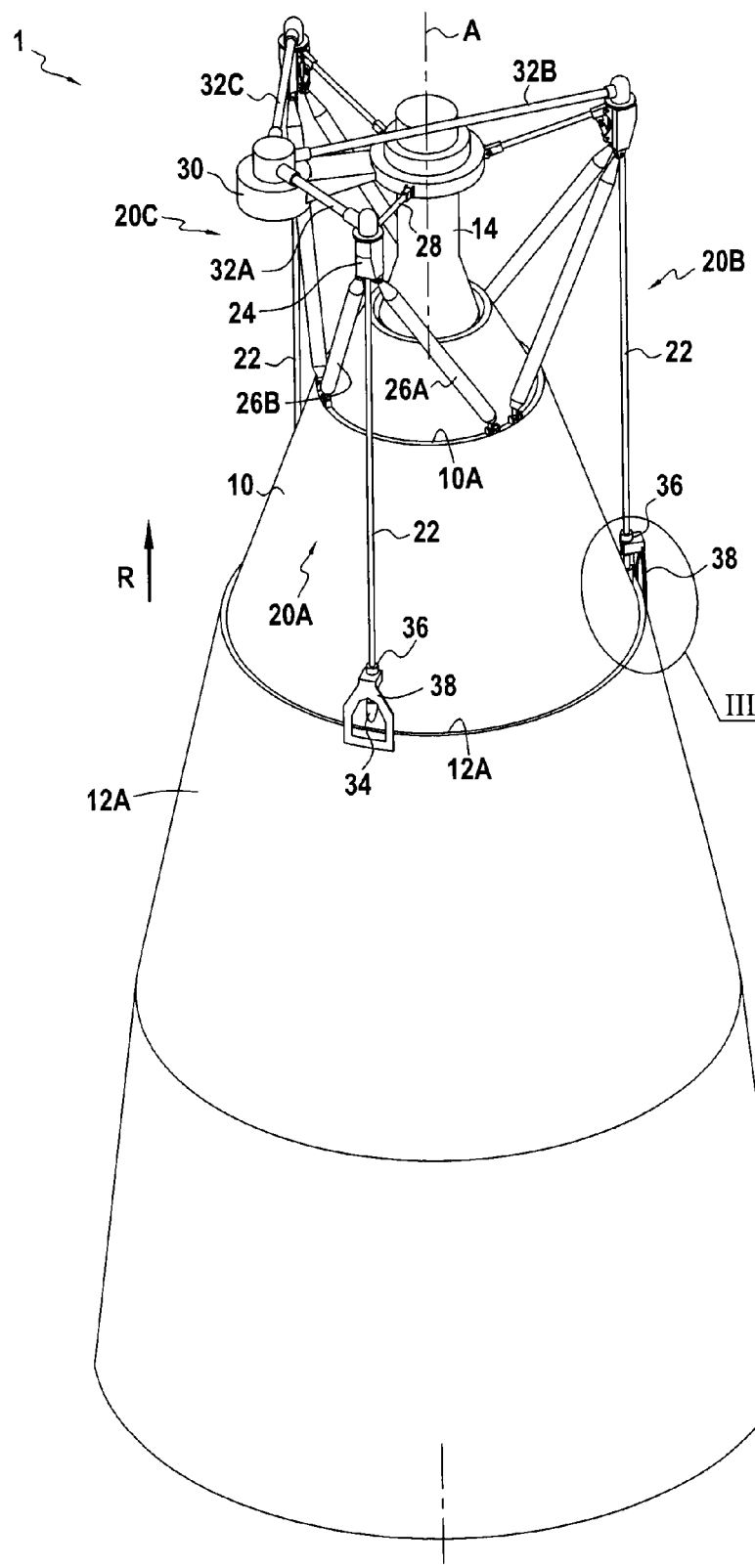
FIG. 1 is a perspective view of a deployable divergent segment to which the invention can be applied, in which view the movable divergent portion is in the deployed position.
Figure 2:
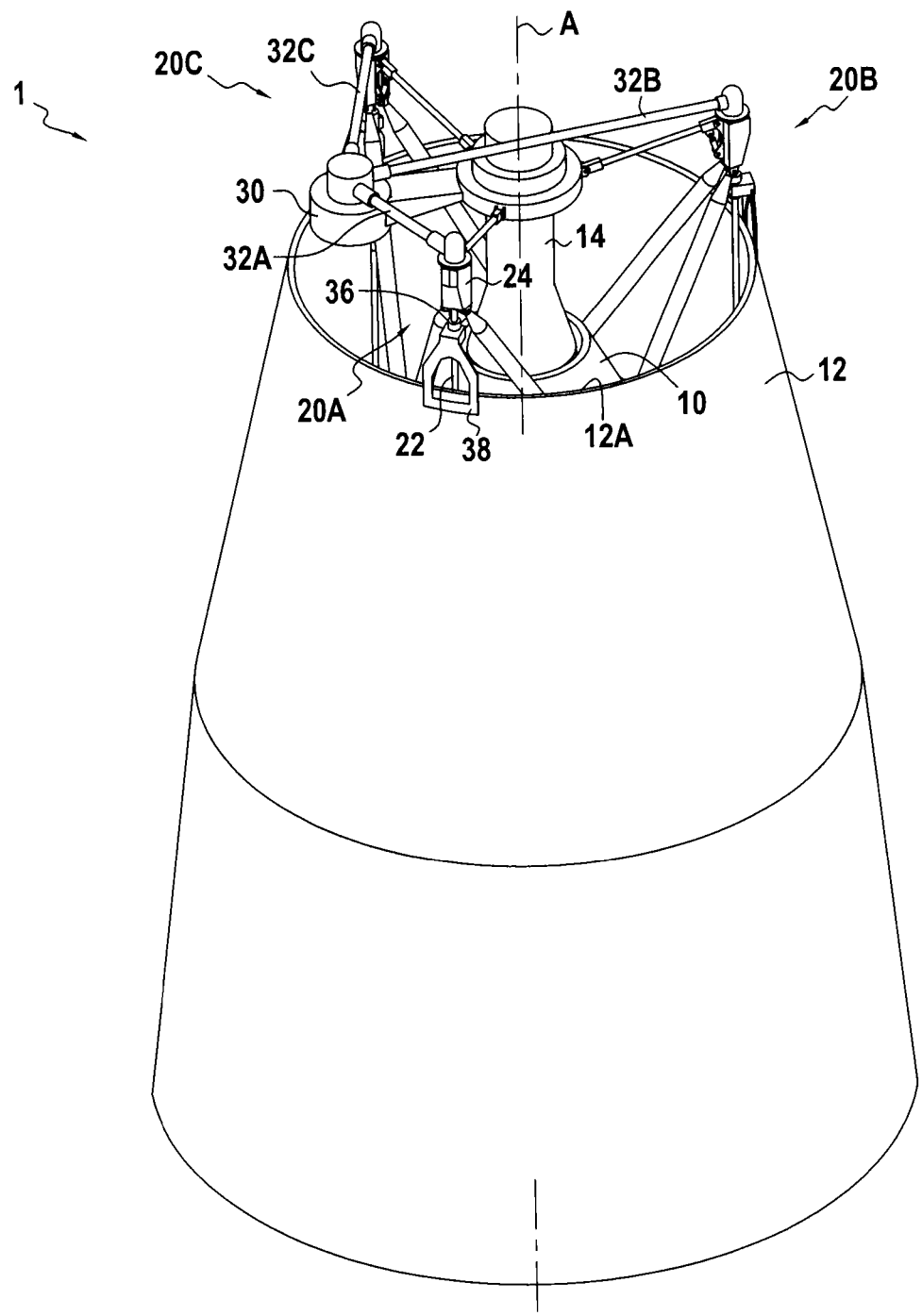
FIG. 2 is a view of the FIG. 1 divergent segment, showing the movable divergent portion in the retracted position.

The description begins with FIGS. 1 and 2 which, for simplification purposes, show only those elements of a deployable divergent segment of a thruster that are needed for understanding the invention.

Thus, in FIG. 1, it can be understood that this deployable divergent segment 1 has a stationary divergent portion 10 and a movable divergent portion 12. The stationary divergent portion is supported by a stationary support of the thruster 14. This portion is fastened to the support by any appropriate means, e.g. by bolting or by welding.

In FIG. 1, the movable divergent portion is arranged after the stationary divergent portion. Thus, the divergent segment is shown in its deployed position. In contrast, in FIG. 2, the divergent segment is shown in its retracted position, the movable divergent portion then being arranged around the stationary divergent portion.

The stationary and movable divergent portions are in the form of truncated cones, e.g. made of metal or of composite material, serving to guide and to steer hot gas derived from the combustion in a thruster, which thruster is not shown.

The invention relates more particularly to the system for deploying the diverging portion. In the example shown, this system comprises three analogous deployment assemblies, angularly distributed around the axis A common to the stationary and movable divergent portions. In FIGS. 1 and 2, these three assemblies are designated respectively by the references 20A, 20B, and 20C.

Since these three assemblies are analogous, the assembly 20A is described by way of example. This assembly comprises a threaded rod 22 having a head (not visible in the drawings) that is supported by a support 24 secured to the stationary divergent portion 10. Specifically, this support 24 is itself carried by two bracket arms, respectively 26A and 26B, that are fastened to the upstream end edge of the stationary divergent portion, and one spacer arm 28 that is fastened to the stationary support 14, extending substantially radially relative to the axis A. The bracket arms and the spacer arm thus provide triangulated support for the head of the rod 22. The ends of these arms that are opposite, respectively from the edge 10A of the stationary divergent portion 10 and from the support 14 serve to carry the support 24 in which the head of the threaded rod 22 is inserted. In this support 24, and in known manner, the head of the threaded rod co-operates with rotary drive means that enable the rod 22 to be rotated.

In known manner, these rotary drive means comprise a motor 30, e.g. an electric motor, and a transmission shaft 32A having its end remote from the motor 30 co-operating with the head of the rod 22 inside the support 24 via suitable angle take-off means, such as gearing or the like. Specifically, it can be seen in FIG. 1 that the motor 30 is common to all three deployment assemblies, co-operating with the supports for the heads of their respective threaded rods via respective transmission shafts 32A, 32B, and 32C.

Returning to the deployment assembly 20A, it can be seen that the tip of the rod 22 remote from its head is inserted in a holder sleeve 34 secured to the stationary divergent portion, and that this rod co-operates with a nut 36 secured to the movable divergent portion 12. The nut 36 is carried by a lug 38 fastened to the movable divergent portion, in the vicinity of its upstream edge 12A.

It can be understood that, when the rod 22 is driven in rotation in the direction for screwing it into the nut 36, this rotation causes the nut 36 to move up along the rod in the direction R shown in FIG. 1, so as to bring the deployable divergent portion into its retracted position as shown in FIG. 2. In the retracted position shown in FIG. 2, the stationary divergent portion 10 and the major fraction of the length of the threaded rod are situated inside the movable divergent portion, the nut 36 being close to the support 24 for the head of the rod 22.

Figure 3:
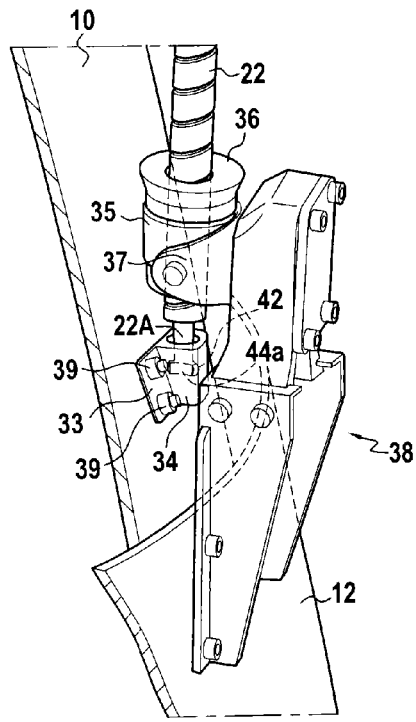
FIG. 3 is a view of detail III of FIG. 1.
Figure 4:
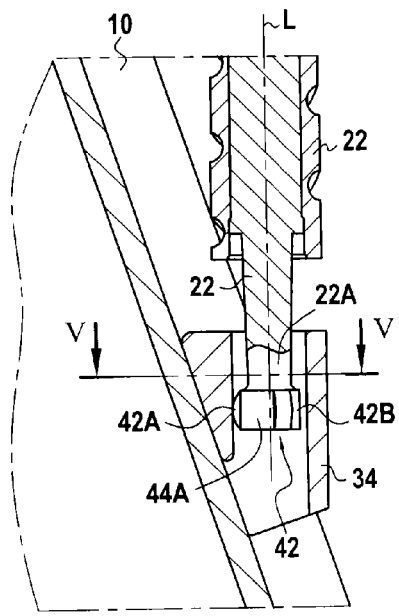
FIG. 4 is a section view on the axis of the threaded rod, showing cooperation between the tip of this rod and a holder sleeve.

With reference to FIGS. 3 and 4, it can be better understood how the tip 22A of the threaded rod 22 is assembled with the above-described elements. There can be seen the sleeve 34 in which the tip 22A of the rod 22 is inserted. Specifically, the sleeve 34 is fastened to the stationary divergent portion 10 by bolts 39 that co-operate with a plate 33 secured to the sleeve 34.

In FIG. 3, there can also be seen the lug 38 that, in addition to its arms for fastening to the movable diverging portion 12, presents a support arm 37 of semi-cylindrical shape that supports a sleeve 35 in which the nut 36 is itself supported, while being free to rotate relative to the lug 38, but without being able to move axially relative thereto.

Figure 5:
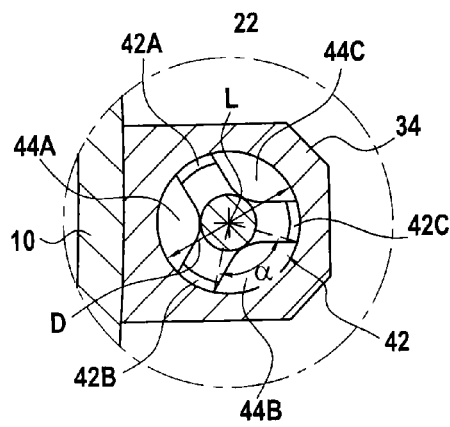
FIG. 5 is a section view on line V-V of FIG. 4.
Figure 6:
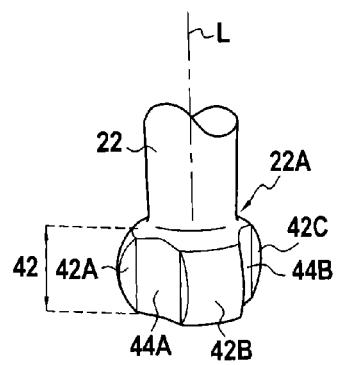
FIG. 6 is a perspective view of the free end of the tip of the threaded rod.

With reference in particular to FIGS. 4 and 6, it can be seen that the tip 22A of the rod presents an enlargement 42 having at least one groove extending axially therethrough, the axial direction extending in the longitudinal direction L of the rod 22. As can be seen better in FIGS. 4 to 6, the enlargement 42 specifically it has three radial branches, respectively 42A, 42B, and 42C, that are separated by respective grooves 44A, 44B, and 44C passing axially therethrough. It can be seen that the three radial branches are regularly spaced apart angularly.

With reference to FIG. 5, it can be understood that the envelope of the enlargement 42 defines maximum diametrical dimensions of the tip of the rod 22, with these maximum diametrical dimensions D corresponding to the inside diameter of the sleeve 34. Thus, while it is rotating, the rod 22 is guided radially by the sleeve 34. Nevertheless, because of the presence of the groove(s) passing axially therethrough, any particles such as dirt flowing around the rod 22 can be exhausted through the sleeve 34 without causing rotation of the rod to jam.

In FIG. 5, it can be seen that the opening angle α of the groove 44B is about 80°. Advantageously, this opening angle, as measured relative to the axis of the rod, lies in the range 30° to 100°, and preferably lies in the range 60° to 90°. As can be seen in FIG. 6, the enlargement 42 presents an outside surface that is rounded. Thus, the envelope of the enlargement forms a portion of a sphere.

What is claimed is:

1. A deployable divergent segment of a thruster comprising a stationary divergent portion, a movable divergent portion suitable for occupying a retracted position and a deployed position, together with a deployment system comprising at least one deployment assembly comprising a threaded rod, a support for a head of the threaded rod secured to the stationary divergent portion, a motor co-operating with the head of the threaded rod, a holder sleeve that is secured to the stationary divergent portion and in which a tip of the threaded rod is inserted, and a nut secured to the movable divergent portion, the tip comprising an enlargement having at least one groove passing therethrough, the at least one groove extending axially through an entire axial length of the enlargement from a first end of the enlargement to a second end of the enlargement, and the threaded rod being suitable for co-operating with the nut secured to the movable divergent portion so that rotation of said threaded rod causes the movable divergent portion to move.

2. The deployable divergent segment of the thruster according to claim 1, wherein the enlargement comprises a plurality of grooves and a plurality of radial branches separated by the plurality of grooves extending axially through the entire axial length of the enlargement.

3. The deployable divergent segment of the thruster according to claim 1, wherein the enlargement has an outside surface that is rounded.

4. The deployable divergent segment of the thruster according to claim 1, comprising three deployment assemblies.

* * * * *